United States Patent
Georgison et al.

(10) Patent No.: US 8,534,208 B2
(45) Date of Patent: *Sep. 17, 2013

(54) PRODUCT CONVEYANCE SYSTEM FOR AN AGRICULTURAL IMPLEMENT

(75) Inventors: Ryan R. Georgison, Sasktoon (CA); Samrendra Singh, Willowbrook, IL (US)

(73) Assignee: CNH Canada, Ltd. (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/544,298

(22) Filed: Jul. 9, 2012

(65) Prior Publication Data

US 2012/0272880 A1 Nov. 1, 2012

Related U.S. Application Data

(62) Division of application No. 12/493,827, filed on Jun. 29, 2009, now Pat. No. 8,234,987.

(51) Int. Cl.
*A01C 7/00* (2006.01)
*A01C 7/06* (2006.01)

(52) U.S. Cl.
USPC ............................. 111/176; 138/40

(58) Field of Classification Search
USPC ................. 111/176, 174; 138/44, 40, 42, 37
See application file for complete search history.

(56) References Cited

U.S. PATENT DOCUMENTS

| | | | |
|---|---|---|---|
| 3,490,654 | A | 1/1970 | Fischer |
| 3,964,639 | A | 6/1976 | Norris et al. |
| 4,280,419 | A | 7/1981 | Fischer |
| 4,562,968 | A | 1/1986 | Widmer et al. |
| 4,872,785 | A | 10/1989 | Schrage et al. |
| 5,392,722 | A | 2/1995 | Snipes et al. |
| 5,775,585 | A | 7/1998 | Duello |
| 5,915,312 | A | 6/1999 | Meyer et al. |
| 5,979,343 | A | 11/1999 | Gregor et al. |
| 6,308,646 | B1 | 10/2001 | Luxon |
| 6,505,569 | B1 | 1/2003 | Richard |
| 6,644,225 | B2 | 11/2003 | Keaton |
| 6,675,728 | B2 | 1/2004 | Lee et al. |
| 6,782,835 | B2 | 8/2004 | Lee et al. |
| 6,994,038 | B2 | 2/2006 | Mariman et al. |
| 7,162,962 | B2 | 1/2007 | Fuessel et al. |
| 7,182,029 | B2 | 2/2007 | Johnson et al. |
| 7,413,387 | B2 | 8/2008 | Pleyer |
| 2006/0243179 | A1 | 11/2006 | Landphair et al. |
| 2007/0022928 | A1 | 2/2007 | Kowalchuk |

*Primary Examiner* — Christopher J Novosad
(74) *Attorney, Agent, or Firm* — Rebecca Henkel

(57) ABSTRACT

An inductor assembly is configured to be attached in flow communication to receive a flow of product from a storage hopper of a product conveyance system. The product conveyance system includes a forced fluid source mounted thereon and operable to provide a forced fluid stream to the inductor assembly. The inductor housing includes an inlet configured to direct a first portion of the forced fluid stream in a path to engage the flow of product so as to generate the combined stream of forced fluid and product. The inductor assembly further includes multiple inductor segments, wherein each inductor segments defines at least one conduit having an inlet and an outlet. One or more of the inlets may be configured to restrict air and product flow therethrough.

7 Claims, 8 Drawing Sheets

PRODUCT CONVEYANCE SYSTEM FOR AN AGRICULTURAL IMPLEMENT

CROSS-REFERENCE TO RELATED APPLICATION

The present application is a divisional of application Ser. No. 12/493,827 filed Jun. 29, 2009 now U.S. Pat. No. 8,234,987.

FIELD OF THE INVENTION

The invention relates to a product conveyance system for conveying product in an agricultural environment and, more particularly, relates to a planting implement with an improved inductor assembly for conveying seed and other particulate material to a planting unit for application in an agricultural environment.

BACKGROUND OF THE INVENTION

In recent years, agricultural implements have employed forced air conveyance systems to deliver seed, fertilizer and herbicides. As the size of these agricultural implements continues to grow, the versatility of such implements becomes more significant. In particular, large air carts or air seeders have become increasingly popular for conveying seed, fertilizer and other product without strict regard for the exact placement of the product. Typically, these large air carts are used for dry land farming (e.g., cereal crops, etc.).

For certain crop planting applications that require row crop planting or seed singulation (e.g., corn, soybean, etc.), the air cart can be combined with an inductor assembly adapted to feed seed or other product from a larger storage hopper into smaller reservoirs located at on-row planting units, also referred to as singulators or receivers. The combined air cart and inductor assembly enables a farmer to singulate planting of seeds on-row from one central hopper filling location. Thereby, the nurse inductor assembly and air cart allows a farmer to plant more acreage before having to stop to fill the central hopper again, resulting in quicker planting and less labor while maintaining the precision spacing available by on-row singulation.

U.S. Pat. No. 6,253,693 discloses a nurse inductor assembly in flow communication with a storage hopper of seed mounted on an air cart. The air cart includes a fan to provide a forced air stream through the inductor assembly. The forced air stream is directed by the inductor assembly to a general location of a seed mass delivered from the storage hopper. The forced air stream engages the seed mass, entraining the seed into the air stream. A movable seed control gate is configured to regulate an angle of repose of a surface of the seed mass, which affects the entrainment of the seed into the forced air stream. The inductor assembly conveys the combined stream of forced air and seed through a series of inductor sections that each leads to an isolated inductor distribution tube and ultimately to a distribution line leading to associated series of remote receivers for application of the seed in an agricultural field. When the receiver is full of seed, the air stream is restricted from escaping the receiver and ultimately reduces the capacity of the air stream at the inductor assembly to induce the seed into the inductor distribution tubes.

This nurse inductor assembly has several drawbacks. For example, the velocity of the combined stream of air and seed product through the distribution line slows as the stream encounters the increased resistance associated with traveling through the deposited seed product at the receiver. If allowed to be induced into the distribution lines below the minimum carrying velocity, the seed product causes blocking of the seed distribution lines. Any seed product that had been entrained into the slower flowing air stream drops out under the force of gravity. A certain quantity of dropped seed product will deposit toward low points in the distribution lines, increasing plugging opportunities. Another drawback of this nurse inductor assembly is that the movable gate is difficult to adjust for various products of different sizes and properties, which can cause uneven product flow to the receivers and/or plugging opportunities in the inductor assembly or distribution lines. Also, the interference of the seed control gate to the flow of the combined stream of air and seed will cause the seed to bridge across the inductor chamber of the inductor apparatus and inhibit the entrainment of seed into the forced air stream.

U.S. Pat. No. 7,222,029 to Johnson et al., and assigned to CNH America, LLC, the assignee of the present application, and the disclosure of which is incorporated herein by reference, describes an inductor assembly for a product conveyance system that overcomes many of the drawbacks of prior art inductor assemblies or "inductor boxes" such as that described in the '693 patent. More particularly, the patent to Johnson et al. describes an inductor assembly for forced air conveyance of product that provides sufficient carrying capacity to convey seed through a distribution line to a remotely located receiver.

Notwithstanding the benefits provided an inductor assembly such as that described by Johnson et al., there remains a need for uniformity of the combined stream of air and product across the inductor assembly and into the distribution lines. That is, many inductor assemblies contain a series of inductor segments, with each inductor segment generally comprised of an upper conduit and a lower conduit. Each conduit has a respective inlet and a respective outlet, and each inlet is designed to receive a combined product and forced air stream that is passed through its corresponding outlet. In a typical configuration, the length of the conduits is not uniform, which can result in a pressure differential across the profile of the inductor segments. In general, the flow rate through the shorter conduits is greater than the flow rate through the longer conduits. As a result, more product may be conveyed through some distribution lines than conveyed through others, which can ultimately lead to an uneven distribution of product to the individual on-row units.

SUMMARY OF THE INVENTION

The present invention provides an inductor assembly configured to be attached in flow communication to receive a flow of product from a storage hopper of a product conveyance system. The product conveyance system further includes a forced fluid source operable to provide a forced fluid stream to the inductor assembly. The inductor assembly includes an inductor housing configured to receive a flow of product from the storage hopper. The inductor housing includes an inlet configured to direct a first portion of the forced fluid stream in a path to engage the flow of product so as to generate the combined stream of forced fluid and product. The inductor assembly further includes multiple inductor segments, wherein each inductor segments defines at least one conduit having an inlet and an outlet. The inlet of the at least one conduit is located to receive the combined stream of forced fluid and product The present invention therefore is directed to an apparatus for controlling the flow rate through the various conduits such that a desired flow rate pattern in a single inductor segment or across multiple inductor segments is realized. In one preferred implementation, one or more of the conduit inlets is fitted with an orifice plate having an opening through which the combined forced air and product stream may be passed. The inlets fitted with such an orifice plate have a restricted air flow characteristic when compared to those inlets not fitted with such an orifice plate. Thus, through judicious use of such orifice plates, a desired air flow profile for the inductor assembly, or individual inductor segments, can be defined.

In one preferred embodiment, the inductor segments associated with shorter distribution lines are fitted with such orifice plates to slow down the flow rate characteristic of the shorter distribution lines and therefore provide for a more uniform air flow velocity across the distribution lines. The size of the opening in the orifice plate can be selected based on the amount of air flow restriction that is desired. Furthermore, the orifice plates may be machined with the conduit inlets or take the form of an insert that is secured to the inlets.

The conduits of a single inductor segment may have orifice plates at each inlet or, alternately, only one of the conduits of the inductor segment may have an orifice plate depending upon the desired flow rate characteristics for the inductor segment. For that matter, one or more of the inductor segments of the inductor assembly may not be fitted with any orifice plates and thus the flow rate characteristics of the distribution lines for those inductor segments would be unchanged.

In a further preferred inductor assembly, motive air, such as that provided by a fan, is provided to the inductor assembly through an upper air inlet and a lower air inlet. Air received through the upper air inlet is designed to increase the volume of air that is provided to the distribution lines and air that passes through the lower air inlet is designed to fluidize product into the air stream that is created by the air that passes through the upper air inlet. In this preferred inductor assembly, an air flow restrictor is mounted to the inductor assembly and is designed to alter the size of the lower air inlet across the width of the lower air inlet. The restrictor, which in one form is a restrictor plate mounted to the inductor assembly generally adjacent the lower air inlet, reduces the size of the lower air inlet at certain points along the lower air inlet. This effectively restricts air flow through certain portions of the lower air inlet to reduce the air flow rate through those certain portion of the lower air inlet.

Therefore, in accordance with one aspect of the invention, an inductor segment is provided that defines a first conduit and a second conduit, the first conduit having a first inlet and a first outlet, and the second conduit having a second inlet and a second outlet. The second outlet of the second conduit is stacked above the first outlet of the first conduit, and in a like manner, the second inlet of the second conduit is generally stacked above the first inlet of the first conduit. One of the inlets has an opening through which the combined forced air and product stream passes that is sized differently than the opening of the other one of the inlets. Thus, air flow through the one inlet, relative to the other one of the inlets, is restricted.

In accordance with another aspect of the invention, an inductor assembly is provided for conveying product in a storage hopper of a planting implement for application in an agricultural field. The planting implement includes a forced fluid source operable to provide a forced fluid stream. The inductor assembly includes an inductor housing configured to receive the flow of product from the storage hopper. The inductor housing includes an inlet to direct the forced fluid stream in a direction toward the flow of product so as to generate the combined stream of forced fluid and product.

The inductor assembly further includes a first inductor segment that defines at least one first conduit in flow communication to receive the combined stream of forced fluid and product generated in the inductor housing. The inductor assembly also includes at least one second inductor segment that defines at least one conduit in flow communication to receive the combined stream of forced fluid and product generated in the inductor housing. The at least one first conduit has a first inlet and the at least one second conduit has a second inlet. The sizes of the first and the second inlets are different such that the flow rate through the first and the second inlets are different from one another.

According to another aspect of the invention, a mobile air cart includes a product conveyance system configured to distribute a supply of product in an agricultural environment. The product conveyance system includes a hopper configured to contain the supply of product, a forced air source operable to provide a stream of force air, a distribution system, and an inductor assembly. The distribution system is configured to convey a combined stream of product and forced air to a planting unit for application of the product in the agricultural environment. The inductor assembly is configured to generate the combined stream of forced air and product. The inductor assembly includes an inductor housing configured to receive a flow of product from the storage hopper. The inductor housing includes an inlet configured to direct a first portion of the forced air stream in a path to engage the flow of product delivered from the storage hopper in such a manner as to generate the combined stream of forced fluid and product. The inductor assembly further has a first inductor segment that defines at least one conduit having an inlet and an outlet and at least one second inductor segment also defining at least one conduit having an inlet and an outlet. The inlet of the first conduit is located in flow communication to receive the combined stream of forced fluid and product. Similarly, the inlet of the second conduit is located in flow communication to receive the combined stream of forced fluid and product. The inlet of the first conduit has an inlet size that is different than the inlet size of the inlet of the second conduit. Thus, the flow rates through the first and second inlets differ from one another.

Other objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

DETAILED DESCRIPTION OF THE PREFERRED EMBODIMENTS

A wide variety of inductor assemblies for conveying product with forced fluid, e.g., air, could be constructed in accordance with the invention defined by the claims. Hence, while preferred embodiments of the invention will now be described with reference to a product conveyed by an air cart, it should be understood that the invention is in no way so limited. The type of conveyance system or machine (e.g., air seeder, row-crop planter, spreader, etc.) can vary. The description generally refers to use of the present invention to convey product, and the invention can be utilized to convey a wide variety of product (e.g., seed, fertilizer, herbicide, pesticide, etc.) and is not limiting on the invention. In addition, the type and size of the product (e.g., soybean, corn, cereal grains, fertilizer, herbicide, etc.) can vary.

Figure 1:
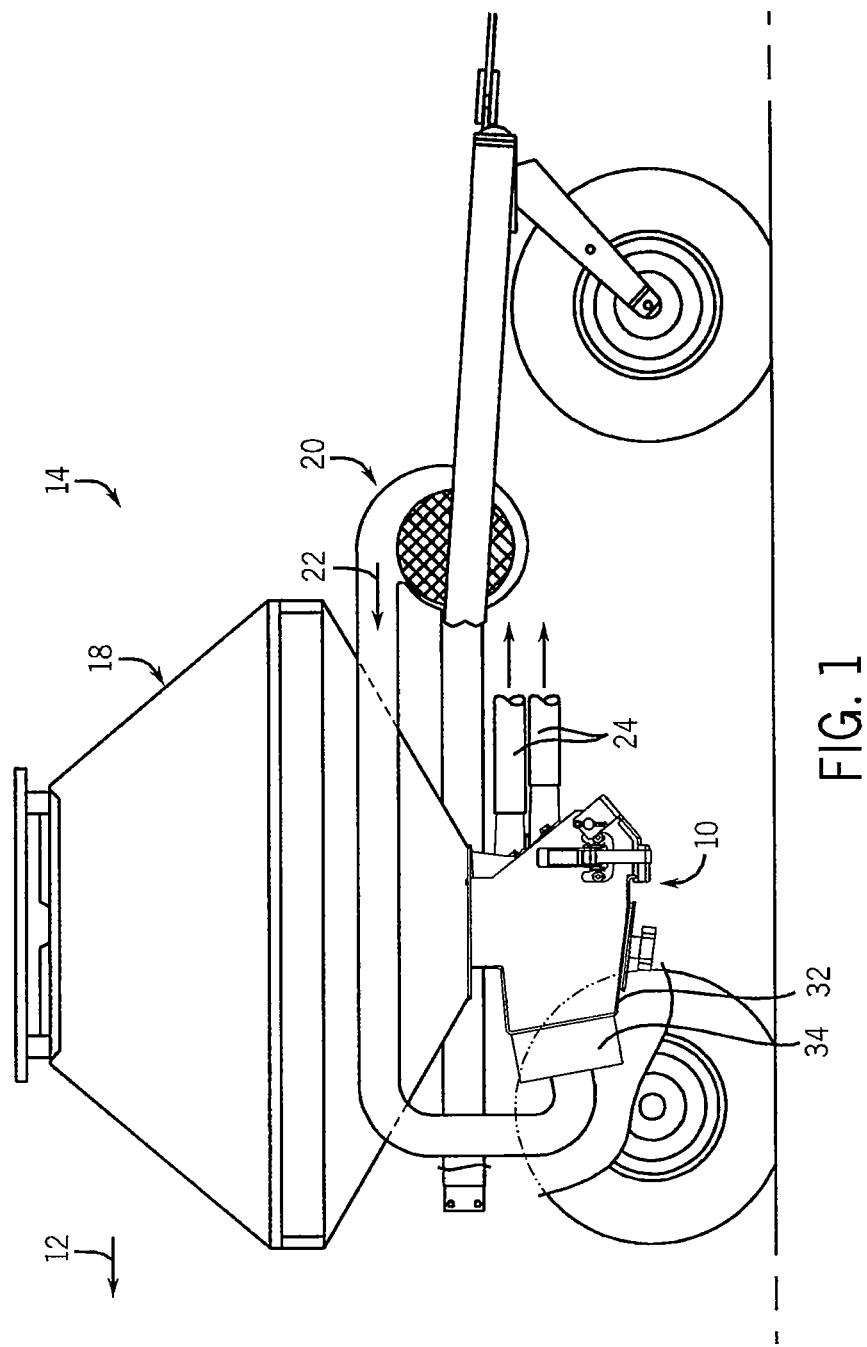
FIG. 1 schematically illustrates a side elevation view of an air cart in combination with an inductor assembly in accordance with one aspect of the present invention.
Figure 2:
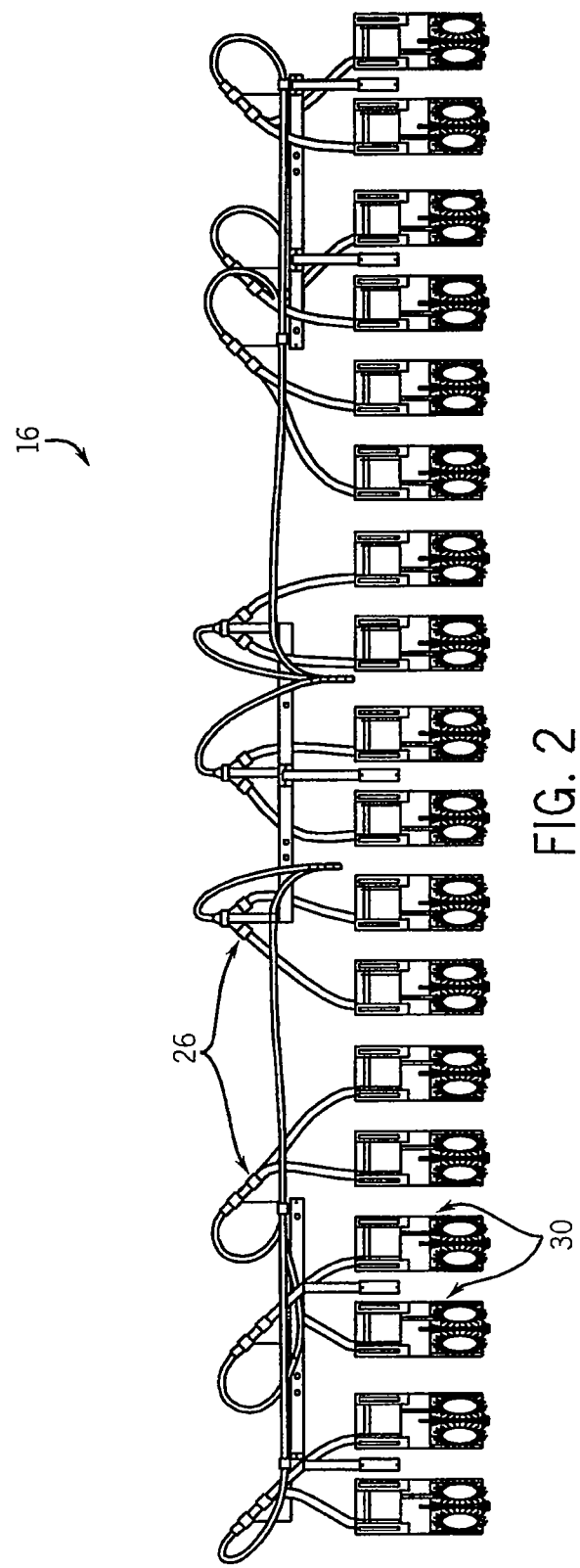
FIG. 2 schematically illustrates a front view of a planter associated with the air cart and inductor assembly of FIG. 1.

FIG. 1 illustrates an inductor assembly 10 of a product conveyance system in accordance with present invention configured to be pulled by a tow vehicle (not shown) in a forward direction of travel (illustrated by arrow 12). The exemplary embodiment of the product conveyance system is a planting implement that includes a conventional air cart 14 in combination with a planter 16 (FIG. 2). The air cart 14 generally includes a main or central storage hopper 18, and a pressurized or forced air source 20. The forced air source 20 (e.g., blower fan, etc.) is operable to provide a stream of pressurized air (illustrated by arrow 22) to the inductor assembly 10. Although the inductor assembly 10 is illustrated in combination with an air cart 14 and a planter 16, it is understood that the type and configuration of the planting implement can vary. For example, the inductor assembly 10 can be mounted with the forced air source 20 on the planter 16.

Still referring to FIG. 1, the inductor assembly 10 is generally configured to direct or guide the stream of forced air (shown by arrow 22) provided from the forced air source 20 into a path that engages the product fed from the storage hopper 18. The forced air stream conveyed from the forced air source 20 into to the inductor assembly 10 pressurizes the inductor assembly 10, as well as agitates the product accumulating in the inductor assembly 10. The turbulence of the forced air stream agitates the accumulation of the product, separating and entraining the product into the air stream.

The forced air stream also creates a vacuum in the inductor assembly 10 such that the combined stream of forced air and entrained product shown by arrow 22 is swept toward and into one or more distribution lines 24 that lead to the planter 16 (FIG. 2). The planter 16 includes a distribution or receiver header 26 in communication with one or more planting units 28 (See FIG. 2). The distribution lines 24 will typically have varying lengths to accommodate the variable spacing of the planting units 28 from the storage hopper 18. The planting unit 28 generally includes a receiver or mini-hopper 30. The individual seed product remains suspended or entrained in the air stream while passing through the receiver header 26 to the planting unit 28. In another embodiment of the planter 16, the combined stream of forced air and entrained product may pass from the one or more distribution lines 24 directly to one or more planting units 28. In a known manner, the air bleeds off through an air vent (not shown) at the planting unit 28, and the entrained individual seed product falls by gravity into a second pile or mass at the receiver or mini hopper 30. The planting unit 28 is thereafter operable to singulate the product for application into a furrow in the ground.

Although the illustrated inductor assembly 10 is shown mounted on the air cart 14, the inductor assembly 10, the hopper 18, and/or the forced air source or combination thereof can be mounted on the planter 16 and is not limiting on the invention.

At the inductor assembly 10, the product is suspended and carried away by the forced air stream only when the velocity of the forced air stream is above the minimum carrying velocity to entrain the product in the air. A forced air stream velocity below the minimum carrying velocity will allow gravity to deposit or remove the product from the air stream.

Figure 3:
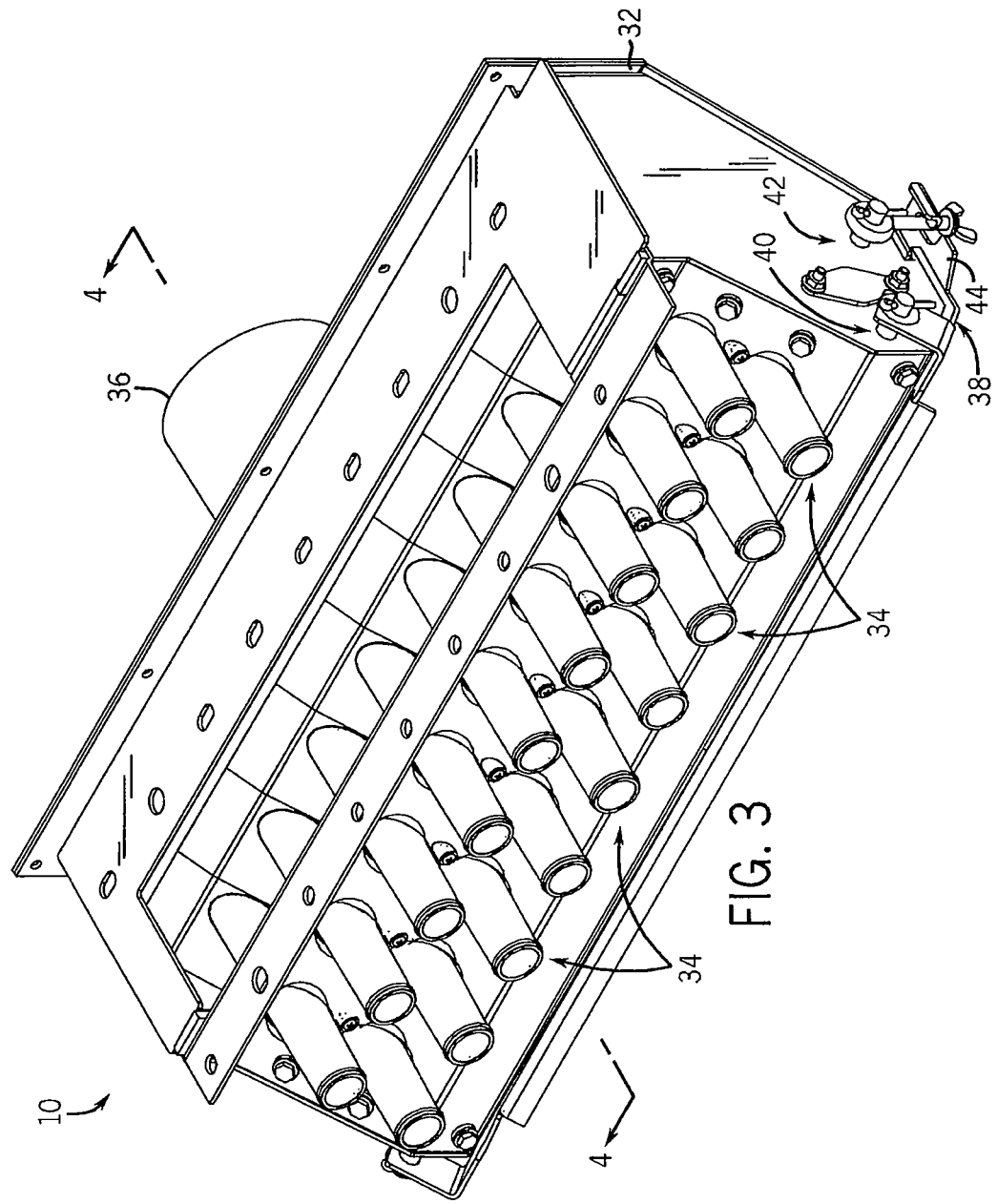
FIG. 3 schematically illustrates an isometric view of the inductor assembly of in FIG. 1.
Figure 4:
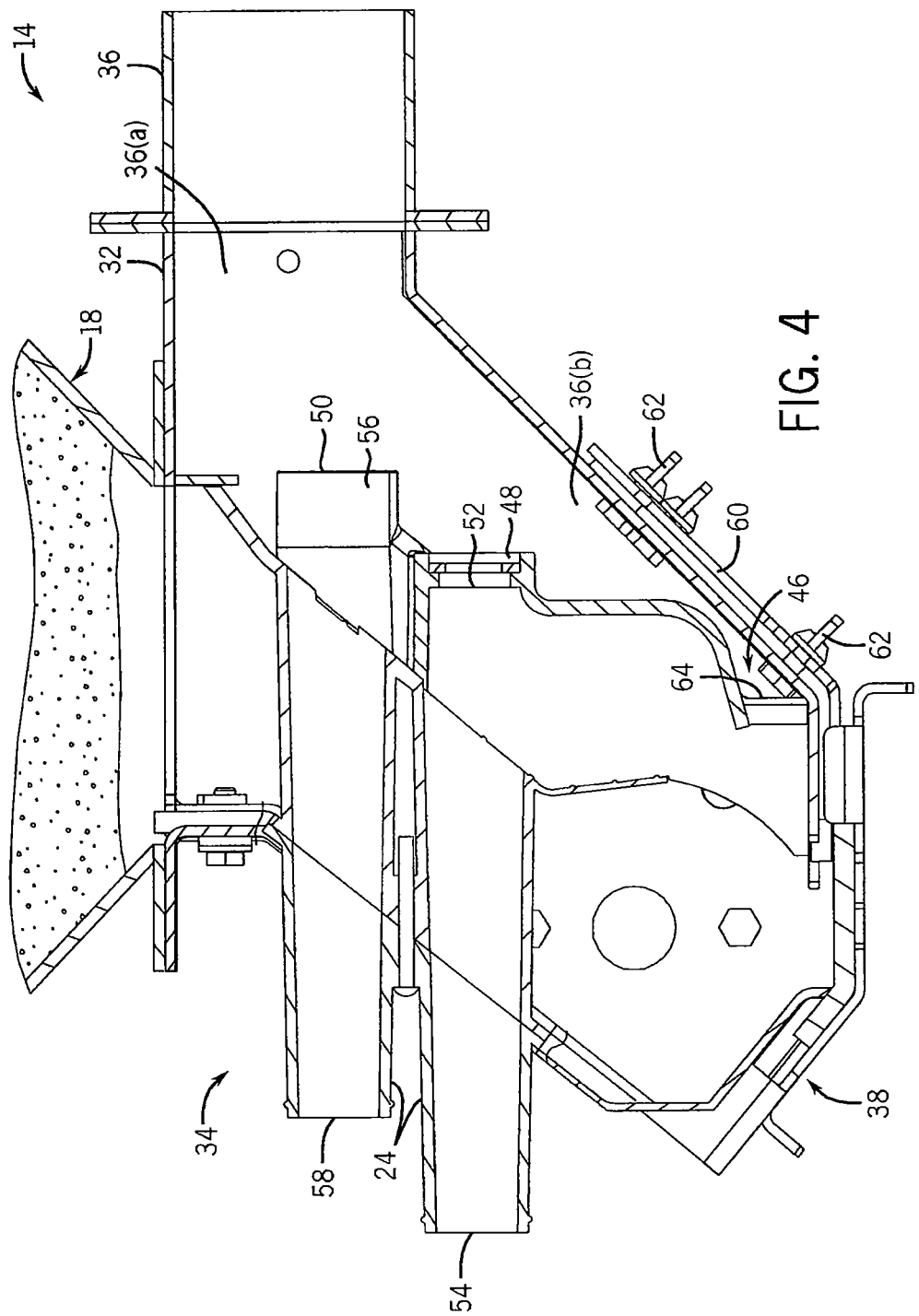
FIG. 4 schematically illustrates a detailed cross-sectional view of the inductor assembly along line 4-4 in FIG. 3 in combination with the storage hopper.

The inductor assembly 10 generally includes an inductor housing 32 configured to enclose a series of inductor segments 34. As shown in FIG. 4, the inductor housing 32 is mounted underneath and in flow communication with the storage hopper 18 of the air cart 14. The preferred inductor housing 32 generally includes an air inlet 36 to receive the forced air stream 22 from the forced air source 20. As shown in FIG. 3, an access door 38 is pivotally coupled to allow access to the interior of the inductor housing 32, as well as to empty the contents of the inductor housing 32. The access door 38 is pivotally mounted by a pivot pin 40 located at the rearward end of the inductor housing 32. A low profile latch mechanism 42 is provided to selectively secure the access door 38 in a closed position against the inductor housing 32. In securing the access door 38 in the closed position the latch mechanism 42 is configured to engage structure 44 mounted on the access door 38.

As illustrated in FIGS. 3-6, the series of inductor segments 34 are located side-by-side along a lateral width of the inductor housing 32. Each inductor segment 34 in combination with the housing 32 defines a nozzle region 46 that directs the forced air stream along a flow path that tangentially engages the pile of product supplied from the hopper 18 at the rearward end of the series of inductor segments 34, relative to the forward direction of travel.

Figure 5:
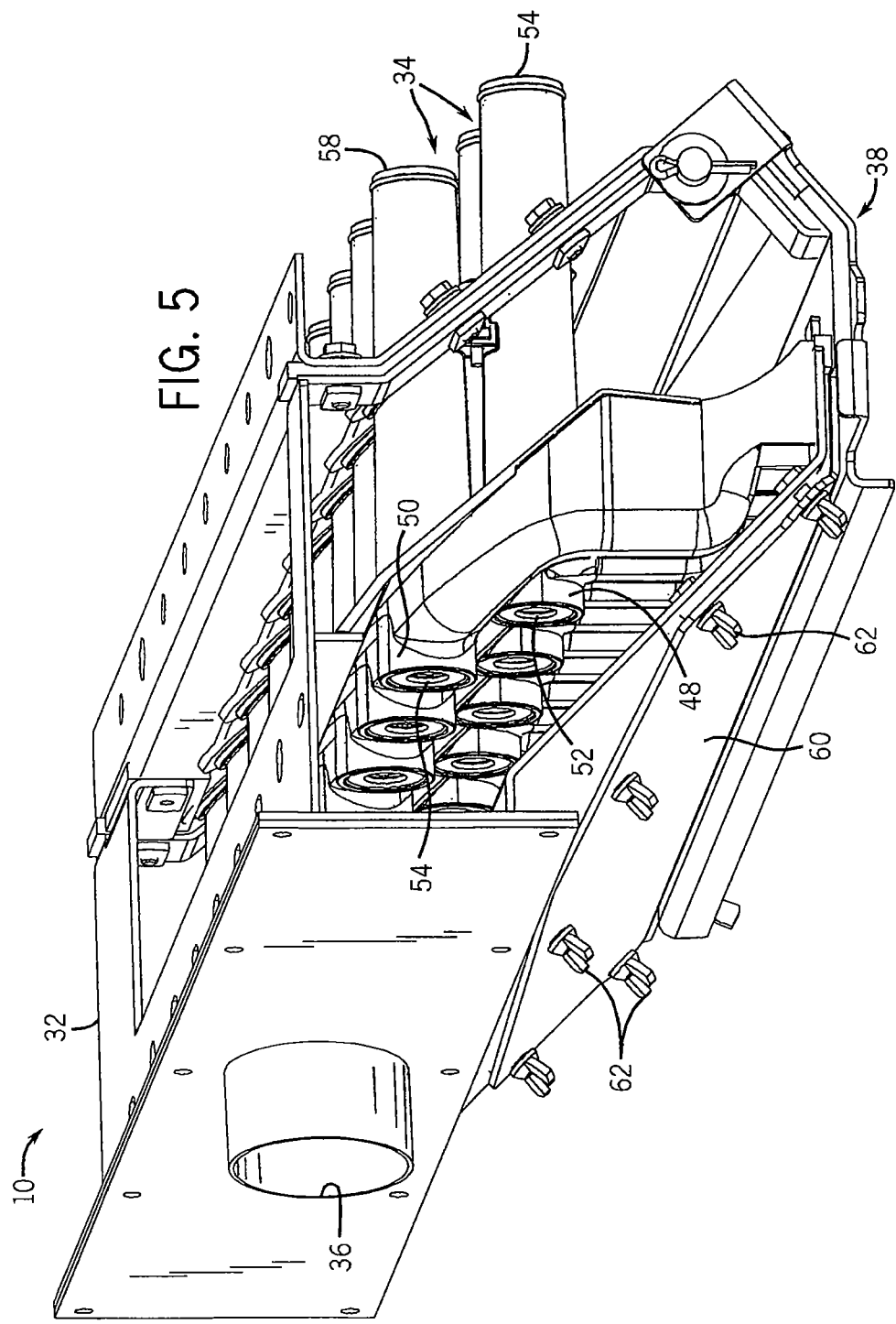
FIG. 5 schematically illustrates an interior view of the inductor assembly shown in FIG. 3, with a portion of the inductor housing removed.
Figure 6:
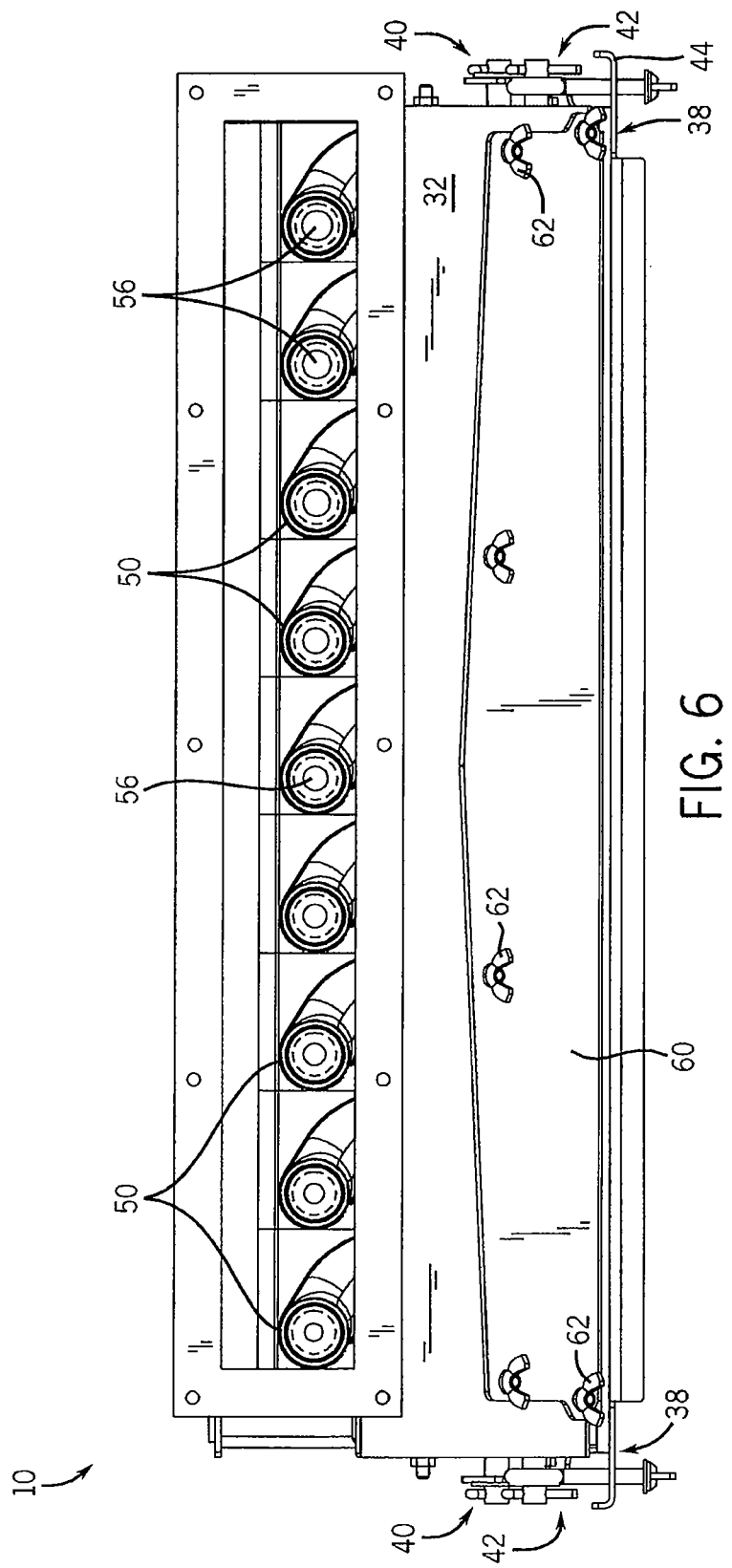
FIG. 6 schematically illustrates a front elevation view of the inductor assembly shown in FIG. 4.
Figure 7:
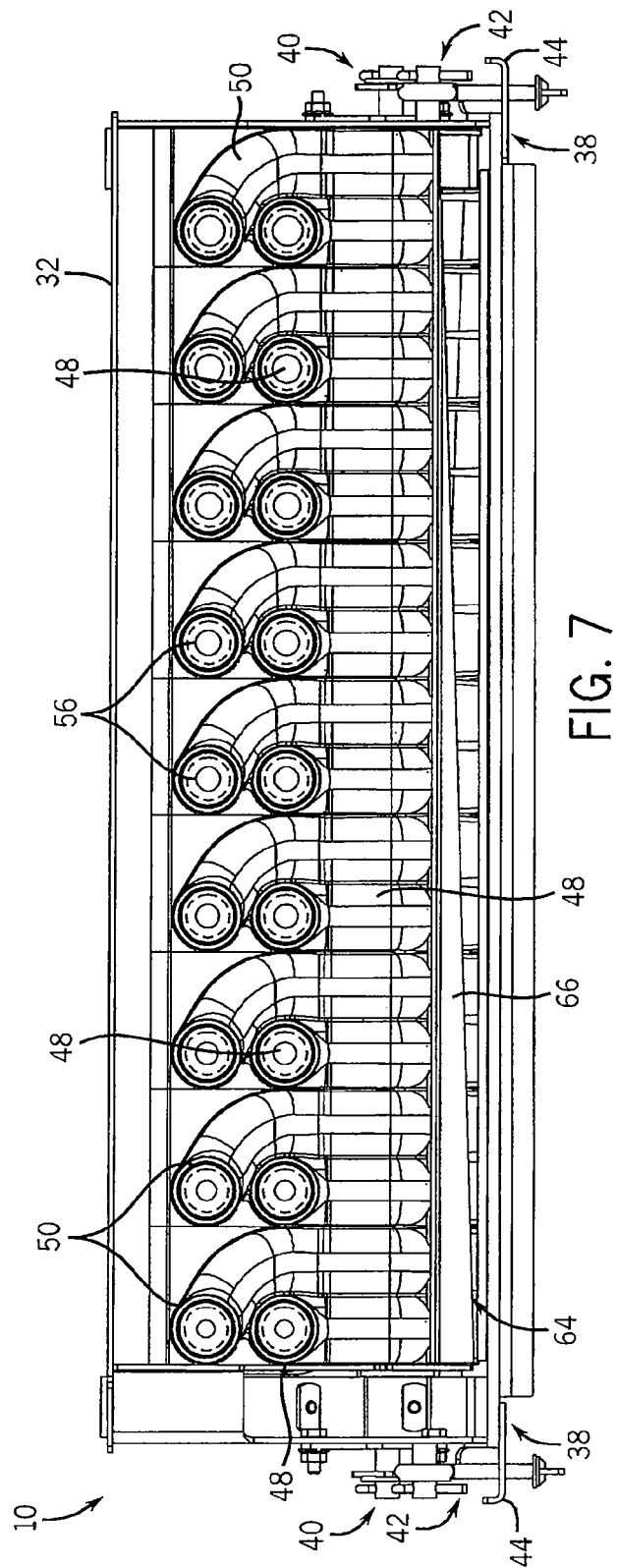
FIG. 7 schematically illustrates a front elevation view of the inductor assembly shown in FIG. 4 with a lower air inlet cover removed.
Figure 8:
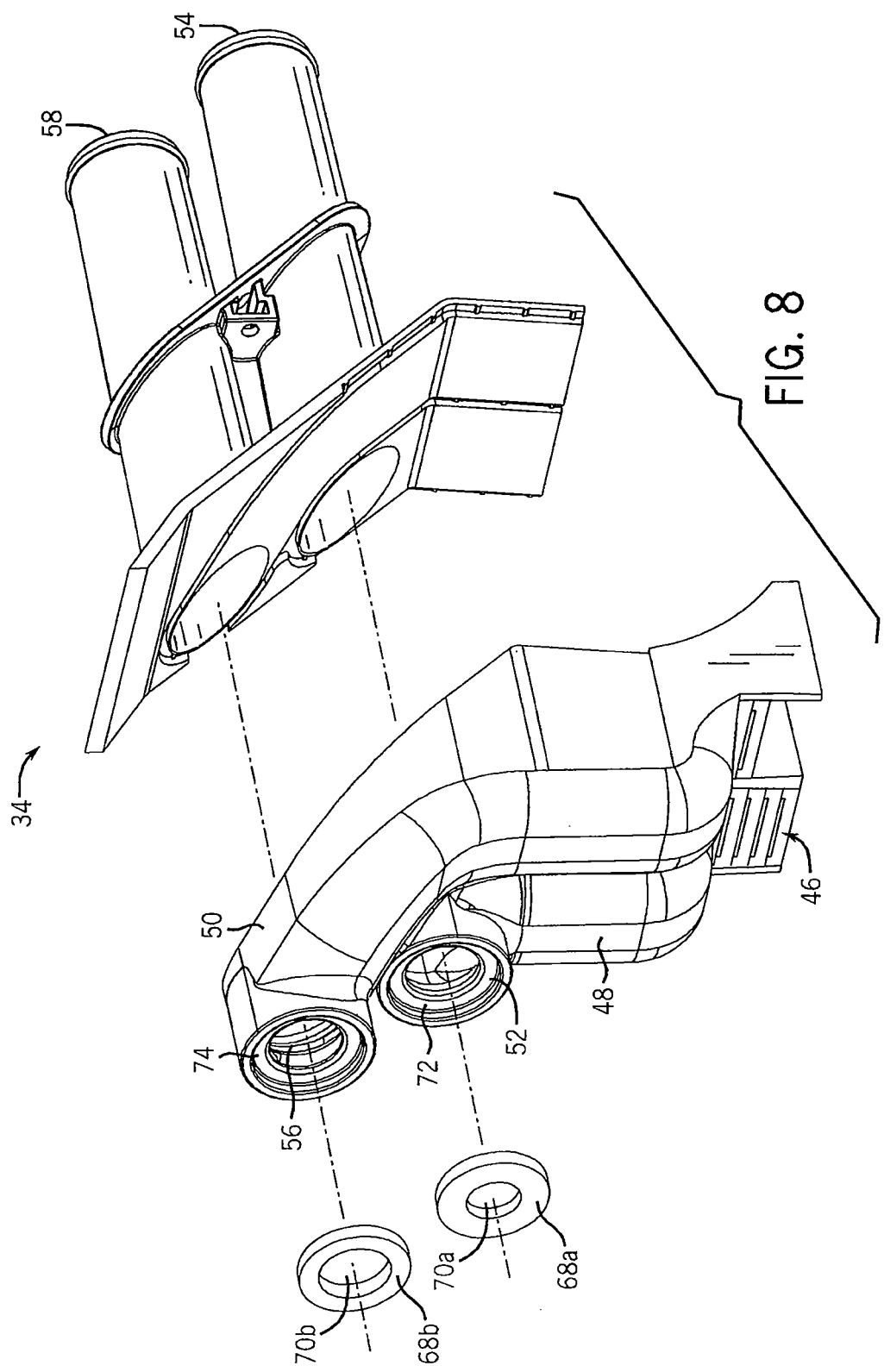
FIG. 8 schematically illustrates an exploded view an inductor segment of the inductor assembly shown in FIG. 4.

Referring to FIGS. 4 and 5, the forced air stream 22 received at the inlet 36 of the inductor assembly 10 is spread across the entire series inductor segments 34. The nozzle regions 46 defined by the inductor segments 34 generally split the air stream 22 at the general location where the product is delivered from the storage hopper 18 of the air cart 14 to the inductor assembly 10. Optionally, a vane, such as that described in U.S. Pat. No. 7,222,029, may be located forward of the nozzle regions 46 of the inductor segments 34 and positioned at an angle with respect to horizontal. U.S. Pat. No. 7,222,029 teaches that a vane may enhance the smooth transition of the flow path of the forced air stream from the inductor inlet 36 toward the pile of product that enhances the air to product ratio, and thereby enhances the efficiency of the forced air stream in suspending the product in the forced air stream.

Each inductor segment 34 generally includes a first product tube 48 and a second product tube 50. The first product tube 48 includes a first inlet 52 and a first outlet 54, and the second product tube 50 includes a second inlet 56 and a second outlet 58. The outlets 54 and 58 of the first and second product tubes 48 and 50, respectively, are connected in flow communication with distribution lines that lead to associated receiver headers 26 and receivers 30 (see FIG. 2). The first and second product tubes 48 and 50 of each inductor segment 34 thereby split the air and entrained product flow to different receivers 30 associated with the respective distribution lines 24 connected to the first and second product tubes 48 and 50. The first and second product tubes 48 and 50 thus prevent a crossover of the combined stream of forced air and entrained product between the different distribution lines 24 and associated receivers 30. The split or division of the combined stream of forced air and product by each inductor assembly 34 enhances operation of the receivers 30 because each distribution line 24 is operable to run at different times, depending on demand as represented by the level of the product amassed at the associated receiver 30. The forced air stream is split in accordance to the demand of the respective receivers 30, as the forced stream of air tends to go to the inductor segments 34 and associated distribution lines 24 in communication with receivers 30 having a lower airflow resistance.

As illustrated in FIG. 4, a cross-sectional area of each of the first and second product tubes 48 and 50, respectively, is greater relative to a cross-sectional area of the associated distribution lines 24. Thereby, the velocity of the combined stream of forced air and product increases upon entering the distribution line 24 above the minimum carrying velocity of the product so as maintain suspension of the product in the forced air stream through the distribution line 24 to the receiver 30 (See FIG. 2).

The first and second product tubes 48 and 50 of each inductor segment 34 direct the air and entrained product stream with relatively small directional changes so as to enhance the efficiency to the forced air source 20. The first product tube 48 and the second product tube 50 of each inductor segment 34 are generally aligned in a modular configuration such that the first inlet 52 of the first product tube 50 is adjacent to the second inlet of the second product tube 50, and the outlet 58 of the second product tube 50 stacks on top of the outlet 54 of the first product tube 48. The vertical nature of this modular design of each inductor segment 34 enhances the compactness of the inductor assembly 10. This modular design configuration also allows the inductor assembly 10 to be readily adapted to different widths and numbers associated with the number of distribution lines 24 and/or receivers 30. The first and second outlets 54 and 58 and respective distribution lines 24 attached thereto are stacked in generally vertical pairs that optimize space beneath the air cart 14.

In operation, the inlet 36 of the inductor housing 32 of the inductor assembly 10 receives the forced air stream from the forced air source 20. The nozzle regions 46 of the series of inductor segments 34 guide the forced air stream in path toward the pile of product delivered from the storage hopper 18. The forced air stream strips away product from the pile of product into suspension in the forced air stream, and the storage hopper 18 replenishes product to the created cavity in the pile of product. The closer to the bottom of the inductor housing 32 that the product is stripped away, the more quickly the product is replenished.

If the forced air stream velocity falls below the carrying velocity of the product, any seed particles that had been entrained into the slow flowing air stream fall out of the airflow and are dropped back into the pile of product. Thus, the seed particles are picked up and carried by the air stream only when the velocity of the forced air stream is above the minimum carry velocity, thereby allowing the forced air stream to flow without transporting any entrained product into the product tubes 48 and 50 of each inductor segment 34.

The distribution or receiver header 26 splits the combined stream of air and product among multiple receivers 30. As an alternate configuration, the combined stream of air and product may be sent directly to the receivers without being split. The receivers 30 are designed to separate the product the forced air stream and product and allow the forced air to readily escape when the level of product is below a predetermined vent level, and limits the amount of the forced air stream to escape when the product level is above the predetermined vent level. The more steady that a rate of the product is induced into the forced air stream, the more reduction in plugging opportunities in the distribution lines 24 and the greater the efficiency of the forced air source 20.

The inductor housing 32 has air inlet 36 that receives the forced air stream. The air inlet 36 is in flow communication with an upper air inlet 36(*a*) and a lower air inlet 36(*b*). In accordance with one preferred embodiment, a cover plate 60 is removably mounted to the inductor housing 32 by fasteners 62, which in the illustrated embodiment are wing nuts although; other types of fasteners may be used. When the cover plate 60 is removed, a restrictor plate 64 is exposed, as shown in FIG. 7. The restrictor plate 64 is fitted within the inductor housing 32 generally adjacent the lower air inlet 36(*b*). The restrictor plate 64 is designed to restrict air flow through the lower air inlet 36(*b*). The restrictor plate may have one of a number of different configurations to affect the flow of air through the lower air inlet 36(*b*). In the illustrated embodiment, the restrictor plate 64 has a flange 66 that tapers from one end of the lower air inlet 36(*b*) to the opposite end of the lower air inlet 36(*b*). Thus, air flow through the lower air inlet 36(*b*) is restricted in a generally linear fashion from one end of the lower air inlet 36(*b*) to the opposite end of the lower air inlet 36(*b*).

With additional reference to FIG. 8, one or more of the product tubes may be fitted with an orifice plate 68 having an opening 70 through which the combined forced air and product stream may pass. The orifice plates(s) 68 are designed to restrict air flow through the product tubes. In one preferred embodiment, orifice plates(s) 68 are fitted to one or more of the first product tubes. That is, product tubes 48 associated with shorter distribution lines 24 are fitted with orifice plates to counteract the increased airflow through the shorter distribution lines relative to the airflow through the longer distribution lines. In this regard, orifice plate 68(*a*) may be used to create more uniformity in flow rates between the various distribution lines. As shown in FIG. 8, the inlets 52 and 54 each have a recessed seat 72, 74, respectively, against which the orifice plates 68(*a*) and 68(*b*) sit. Further, it will be appreciated that orifice plate 68(*a*) has a smaller opening 70(*a*) than the opening 70(*b*) of orifice plate 68(*b*). Thus, orifice plate 68(*a*) is more flow restrictive than orifice plate 68(*b*).

It will be appreciated that the orifice plates may be machined with the product tube inlets or may take the form of a separate component that is fitted within the inlets. In one preferred embodiment, the inlets have a seat against which the orifice plates sit and a suitable sealant or other fastening means is then used to secure the orifice plate in place. Additionally, it is contemplated that the orifice plates may be removed and replaced with other orifice plates having differently sized openings to change the flow rate through the product tubes.

The embodiment of the inductor assembly 10 described above is described in combination with the standard air cart 14 having the hopper 18 and the pressurized air source 20. Although the above-description referred to the inductor assembly 10 combined with an air cart 14, it is understood that the inductor assembly 10 of the present invention is adaptable for use with a stand-alone blower and product storage tank or vessel, as well as adapted for incorporating with other types of agricultural implements. Furthermore, the above-described embodiment of the inductor assembly 10 of the invention can be constructed integrally with an air cart 14, or as a modular unit that can be coupled to a standard air cart structure to convert the air cart 14 into a inductor-type of planter.

Furthermore, one skilled in the art will recognize that the present invention can be used to convey numerous types of products (e.g., seed, fertilizer, herbicides, pesticides, etc.) that exhibit suitable properties for forced air conveyance. Furthermore, the typical air cart 14 can be provided with multiple hoppers containing different types of products for application in an agricultural environment. For example, one hopper could have seed product stored therein, while another tank would have fertilizer and yet another tank could have herbicides or still another reservoir of fertilizer. In such multi-tank configurations, one of the tanks could be provided with the inductor assembly 10 to convey seed product to the planting devices, while another inductor assembly 10 is used to control the flow of fertilizer or other product to the planting devices. Thereby, the forced air source 20 on the air cart 14 can be used for both fertilizing and seed planting operations simultaneously. Furthermore, the combined air cart 14 and inductor assembly 10 can be used to apply the fertilizer or other product at a variable rate as controlled by an electronic controller, as is known for precision farming techniques. Other alternative configurations can include one inductor assembly 10 operable to convey seed product to all the receivers 30 (e.g., singulator), as well as multiple inductor assemblies 10 operable to convey seed product to any one particular receiver 30.

Many changes and modifications could be made to the invention without departing from the spirit thereof. The scope of these changes will become apparent from the appended claims.

We claim:

1. A product conveyance system for use with an agricultural implement, the system comprising:
    a hopper configured to contain a supply of product;
    a forced fluid source operable to provide a force fluid stream;
    a planting unit configured to apply the product to a planting surface; and
    an inductor box including an inductor housing defining an interior and being operable to provide a combined stream of forced fluid and product to the planting unit, the inductor box including;
    a plurality of inductor segments in fluid communication with the forced fluid source and the hopper to receive the combined stream of forced fluid and product, wherein each inductor segment comprises a first product tube arranged at least partially within the interior of the inductor housing defining a first inlet and a first outlet and a second product tube arranged at least partially within the interior of the inductor housing and defining a second inlet and a second outlet;
    a set of first conduits including a first distribution line flow coupled to the first outlet of the first product tube and a set of a second conduits including a second distribution line flow coupled to the second outlet of the second product tube, wherein the first distribution line has a first length and the second distribution line has a second length different from the first length; and
    wherein one of the first inlet and the second inlet has an orifice insert arranged within the interior of the inductor housing that affects a flow rate therethrough such that flow rate through the first and the second distribution lines is substantially similar despite a difference in length between the first and the second distribution lines.

2. The product system of claim 1 wherein the first distribution line is longer than the second distribution line and wherein the second inlet has the orifice insert and wherein the orifice insert is defined by an orifice plate defining an opening for restricting airflow through the second product tube.

3. The product conveyance system of claim 1 wherein the first and second product tubes define openings of different sizes to counteract differences in airflow through the first and second distribution lines for providing uniformity in flow rates therebetween.

4. The product conveyance system of claim 3 wherein the orifice insert is integrally formed with the second inlet.

5. The product conveyance system of claim 1 wherein the inductor box has an upper air inlet and a lower air inlet in fluid communication with the forced fluid stream.

6. The product conveyance system of claim 5 further comprising a restrictor plate removably mounted to the inductor box generally adjacent the lower air inlet and configured to create a non-uniform air flow distribution across the lower air inlet.

7. The mobile air cart of claim 6 wherein the orifice insert is removably secured to a respective inlet of a respective product tube.

* * * * *